United States Patent [19]

Nakanishi

[11] Patent Number: 4,958,945

[45] Date of Patent: Sep. 25, 1990

[54] SPINDLE UNIT

[75] Inventor: Tsutomu Nakanishi, Kunitachi, Japan

[73] Assignee: C.S.U. Ltd., Tokyo, Japan

[21] Appl. No.: 344,674

[22] Filed: Apr. 6, 1989

Related U.S. Application Data

[63] Continuation of Ser. No. 920,700, Oct. 17, 1986, abandoned.

[30] Foreign Application Priority Data

| Oct. 25, 1985 | [JP] | Japan | 60-162972 |
| Nov. 27, 1985 | [JP] | Japan | 60-183385 |
| Dec. 6, 1985 | [JP] | Japan | 60-188660 |
| Apr. 15, 1986 | [JP] | Japan | 61-57328 |
| May 21, 1986 | [JP] | Japan | 61-77195 |

[51] Int. Cl.$^5$ ............................................. F16C 19/08
[52] U.S. Cl. ............................... 384/512; 384/514; 384/517; 384/543; 384/615
[58] Field of Search ............... 384/512, 514, 545, 615, 384/517, 543

[56] References Cited

U.S. PATENT DOCUMENTS

| 709,441 | 9/1902 | Henderson | 384/551 |
| 1,457,954 | 6/1923 | Batcheller | 384/545 |
| 2,302,742 | 11/1942 | Crise | 384/517 |
| 4,611,933 | 9/1986 | Hofmann et al. | 384/512 |

Primary Examiner—Lenard A. Footland
Attorney, Agent, or Firm—Ladas & Parry

[57] ABSTRACT

A spindle unit adapted to be used for miniature motors and miniature rotors.

19 Claims, 11 Drawing Sheets

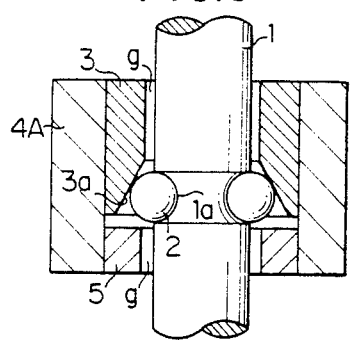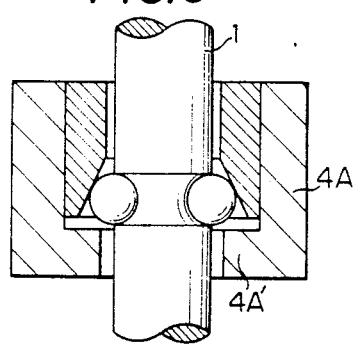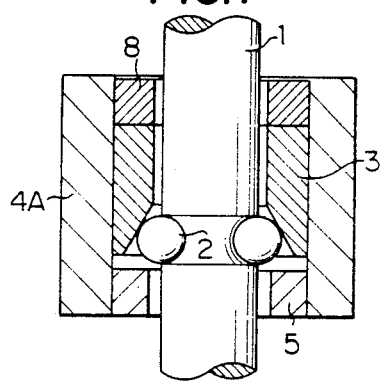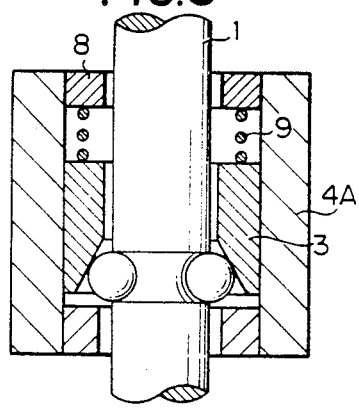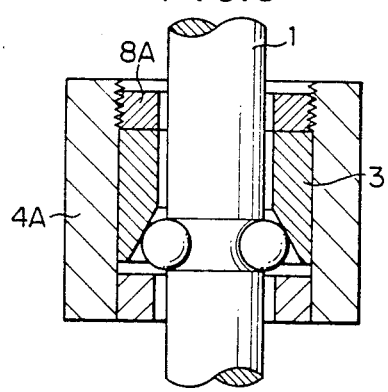

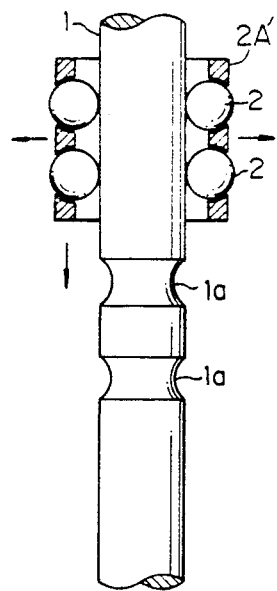
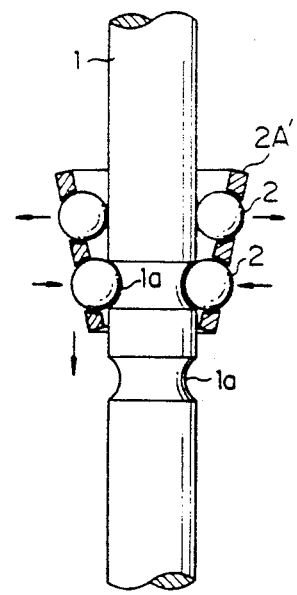
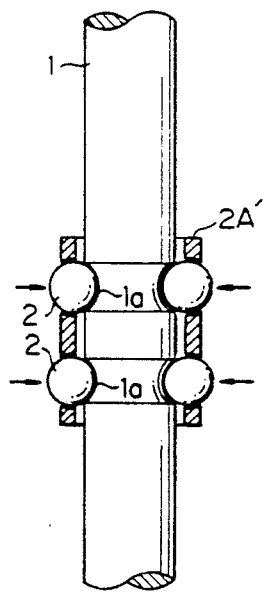
FIG.17(1)   FIG.17(2)   FIG.17(3)

4,958,945

SPINDLE UNIT

This is a continuation on, application Ser. No. 920,700 filed Oct. 17, 1986, abandoned.

BACKGROUND OF THE INVENTION

A spindle unit used for miniature motors and miniature rotors has been hitherto formed as shown in FIG. 21.

That is to say, a pair of radial ball bearings 21 and 22 are arranged above and below on the outer periphery of a shaft 20, a cylindrical spacer 23 is arranged between the respective outer races 21a and 22a of these radial ball bearings 21 and 22 to determine the respective positions of the radial ball bearings 21 and 22 with each other, the radial ball bearings 21 and 22 and the cylindrical spacer 23 are fixed within a hole H in a bearing housing 24 and such rotor 25 as a pulley, disk or turntable is fixed to the end part of the shaft 20 to rotate the shaft 20 side.

However, in the spindle unit of the above mentioned construction, in order to prevent dust or the like from entering the radial ball bearings 21 and 22 and reducing the performance, there has been used a so-called double sealing structure wherein sealing members S are arranged on both sides of balls 21c provided within the radial ball bearings. These radial ball bearings 21 and 22 have defects that they have many component parts, are complicated to assemble and are therefore high in the cost.

A rotary mechanism using the above mentioned marketed conventional radial ball bearings 21 and 22 is of a structure wherein balls 21c and 22c are contained respectively in the clearances between the inner races 21b and 22b and outer races 21a and 22a and has defects that the numbers and diameters of the balls 21c and 22c are predetermined and the balls can not be increased in the diameter, number and rigidity as required.

SUMMARY OF THE INVENTION

This invention seeks to overcome the above mentioned defects and has it as an object to provide a spindle unit wherein the radial ball bearing part construction and assembly are simplified and the cost is reduced.

Another object is to provide a spindle unit whose the precision is improved by integrating the inner races with the shaft and working the bearing housing after assembling it.

A further object is to provide a spindle unit wherein the number of balls can be increased as required in the assembling step and any desired rigidity can be easily retained.

Another object of the present invention is to provide a spindle unit which avoids the complexity in the conventional radial ball bearing, in order to make the clearance between the inner race and outer race proper for the diameter of the balls, the dimensions of the outside diameter of the inner race and the inside diameter of the outer race must be measured so as to obtain a combination keeping a proper clearance; the diameter of the balls can be made somewhat larger as required and the rigidity can be increased.

BRIEF DESCRIPTION OF THE DRAWINGS

FIG. 5 is a schematic vertical sectional view of the fifth embodiment of the present invention.

FIG. 6 is a schematic vertical sectional view of the sixth embodiment of the present invention.

FIG. 7 is a schematic vertical sectional view of the seventh embodiment of the present invention.

FIG. 8 is a schematic vertical sectional view of the eighth embodiment of the present invention.

FIG. 9 is a schematic vertical sectional view of the ninth embodiment of the present invention.

FIGS. 17(1) to (3) are explanatory views of the assembly.

DESCRIPTION OF THE PREFERRED EMBODIMENTS

Figure 1:
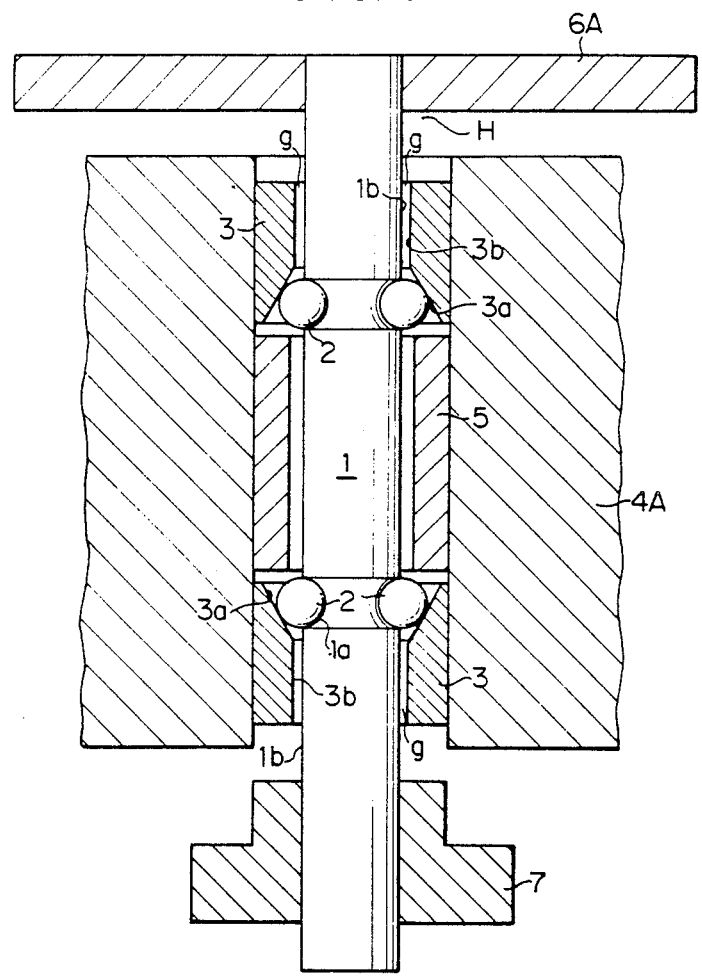
FIG. 1 is a schematic vertical sectional view of the first embodiment of the present invention.

In the first embodiment of the present invention shown in FIG. 1, grooves 1a of a semicircular cross-section for receiving balls 2 are formed as separated from each other by cutting or grinding over the entire periphery in the upper and lower parts of the outer periphery of a columnar shaft 1 and a proper number of balls 2 are partly and rotatably received in these grooves 1a. The respective balls 2 are rotatably supported in contact with tapered surfaces 3a formed in substantially cylindrical outer races 3. These outer races 3 are provided around the outer periphery of the shaft 1 and outside the balls 2 and have the above mentioned tapered surfaces 3a at the inner ends. The outer peripheral surface 1b of t. ˈ shaft 1 and the opposed inner peripheral surface 3b ᴄ the outer race 3 are not in contact with each other and ₍orm a gap g for preventing dust. A cylindrical sleeve 5 is provided between a pair of spaced outer races 3 to prevent the balls 2 from dropping in assembling, sleeves being fixed on the inner peripheral surface of a hole H in a bearing housing 4A, is positioned at the respective outer ends near the balls 2 and is not in contact with the outer races 3, balls 2 and shaft 1. In some case, the sleeve 5 can be fitted to the shaft 1.

The respective outer races 3 are also fixed to the inner peripheral surface of the hole H in the bearing housing 4A.

The shaft 1 is provided in the lower part with a pulley 7 and in the upper part with a rotor 6A such as a pulley, disk, turntable or drum to thus form a rotary structure.

In assembling, first of all, the sleeve 5 is fixed as by pressing substantially in the middle of the hole H in the bearing housing 4A and the shaft 1 is inserted into the sleeve 5. Then, a proper number of upper or lower balls are put into the ball receiving groove 1a and grease or oil is injected into the same part. Then, the outer race 3 positioned on the side of an opening of the hole H is put in through the opening to press the balls 2 with the tapered surface 3a and is fixed in a proper position on the inner peripheral surface of the bearing housing 4. Then, the balls 2 and outer race 3 on the other side may be put in in the same manner. The rotor 6A and pulley 7 are properly fitted to the shaft 1.

In the above mentioned assembling step, before the rotor 6A and pulley 7 are fixed, the rotation precision of the shaft 1 can be confirmed and, by finely adjusting the position of the outer race 3, the clearance from the balls 2 can be easily adjusted and a favorable rotary performance can be obtained.

In use, the inner peripheral surface 3b of the outer race is so close to the outer peripheral surface 1b of the shaft 1 that entry of dust into the ball part can be prevented by dust preventing fine gap g to a very little amount.

Figure 2:
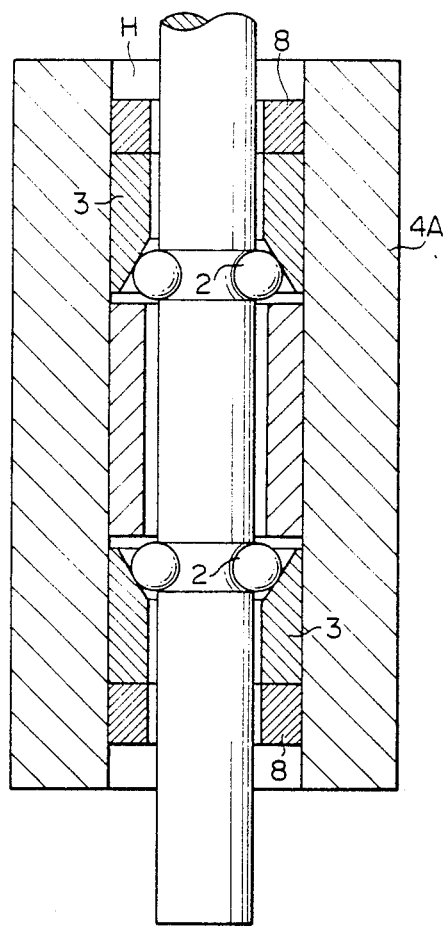
FIG. 2 is a schematic vertical sectional view of the second embodiment of the present invention.

In the second embodiment of the present invention shown in FIG. 2, the outer races 3 are not fixed but are slidably fitted in the inner peripheral surface of the hole H in the bearing housing A and are fixed by outer race pressers 8 respectively provided outside the outer races 3 and fixed to the inner peripheral surface. In such case, there is a feature that both or either of the upper and lower outer race pressers 8-are or is made of such elastic material as rubber so as to give an initial pressure to the outer races 3 in contact with the balls 2 and to prevent a backlash from being caused by the wear of the ball rolling surfaces.

The other constructional features are the same as in the first embodiment.

Figure 3:
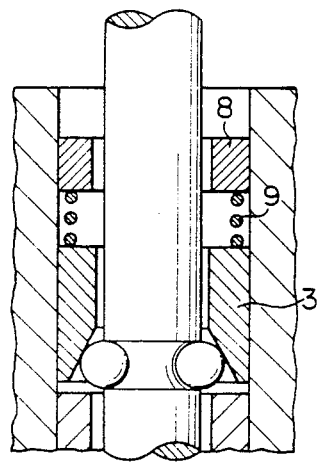
FIG. 3 is a schematic vertical sectional view of the third embodiment of the present invention.

In the third embodiment of the present invention shown in FIG. 3, a resilient member such as a spring 9 is provided between the outer race 3 and outer race presser 8 so as to apply an initial pressure to the outer race 3.

Figure 4:
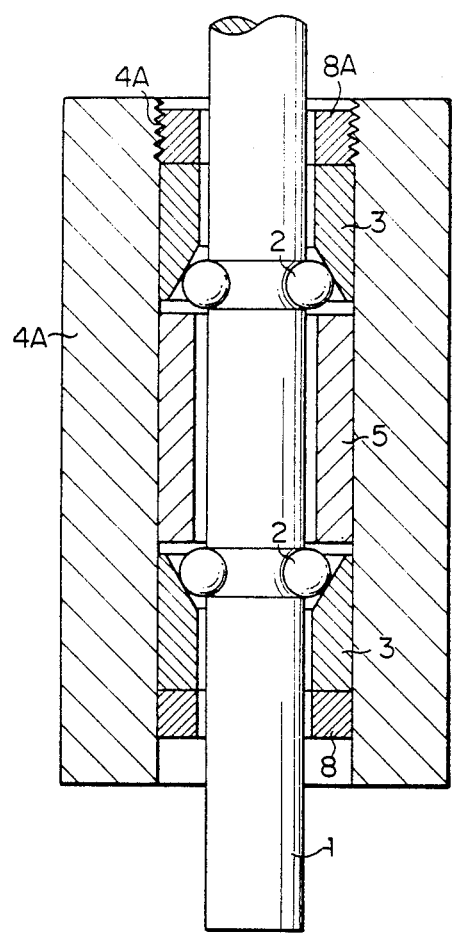
FIG. 4 is a schematic vertical sectional view of the fourth embodiment of the present invention.

In the fourth embodiment of the present invention shown in FIG. 4, one of the outer race pressers is formed as an outer race adjusting screw 8A which is threaded in the inner threaded surface 4A of the bearing housing so that, by adjusting screw 8A for adjusting the clearance, the position of the outer race 3 may be adjusted and the clearance between the ball 2 and outer race 3 may be adjusted. By the way, the other outer race presser 8 is fixed to the bearing housing 4A.

The fifth embodiment of the present invention is shown in FIG. 5. In the first to fourth embodiments, two ball parts are provided but, in the subsequent embodiments (shown in FIGS. 5 to 9), the ball part is provided on only one side.

That is to say, in the fifth embodiment, the groove 1a of a semicircular cross-section is formed in a part of the outer periphery of the columnar shaft 1 and the balls 2 are rotatably held by this groove 1a and the tapered surface 3a of the outer race 3 fixed to the inner peripheral surface of the bearing housing 4A. The cylindrical sleeve 5 to be fixed to the inner peripheral surface of the bearing housing 4A is provided near the balls 2 and the tapered surface 3a of the outer race 3. In such case, the dust preventing gap g is formed between the inner peripheral surfaces of the outer race 3 and sleeve 5 and the outer peripheral surface of the shaft 1.

In assembling, within the bearing housing 4A, the sleeve 5 is fixed, then the shaft is inserted and a proper number of balls 2 are put in through the other opening and are positioned in the groove 1a. In such case, the balls 2 are prevented by the sleeve 5 from dropping. Then, the outer race 3 may be put into the bearing housing 4A from the tapered surface 3a side to be fixed in a proper position.

By the way, the shaft 1 may be supported in the other part, as required, by an ordinary radial bearing, plane bearing or pivot bearing.

The sixth embodiment of the present invention shown in FIG. 6 is different from the fifth embodiment in that a sleeve 4A' extending toward the shaft 1 is formed integrally with the inner peripheral surface of one end part of the bearing housing 4A. The other constructional features are the same.

In the seventh embodiment of the present invention shown in FIG. 7, the outer race 3 is loosely fitted within the bearing housing 4A and is fixed by the outer race presser 8 made of an elastic member arranged outside the outer race 3 so as to apply an initial pressure by the elasticity of the outer race presser 8 to prevent a backlash from being caused by the wear of the ball rolling surface. The other constructional features are the same as in the fifth embodiment.

The eighth embodiment of the present invention shown in FIG. 8 is different from the seventh embodiment in that the outer end of the outer race 3 loosely fitted within the bearing housing 4A and the inner end of the outer race presser 8 of a nonelastic member fixed within the bearing housing 4A are separated from each other and a resilient member 9 such as a spring is mounted between them so as to give an initial pressure to the outer race 3. It is needless to say that, in such case, the outer presser 8 is not particularly required to be of an elastic member.

In the ninth embodiment of the present invention shown in FIG. 9, the outer race adjusting screw 8A is provided in the inner peripheral part of the bearing housing 4A outside the outer race 3 to thereby make it possible to adjust the clearance. In this case, too, the sleeve 5 for preventing the balls from dropping may be fitted to the shaft 1 side.

Figure 10A:
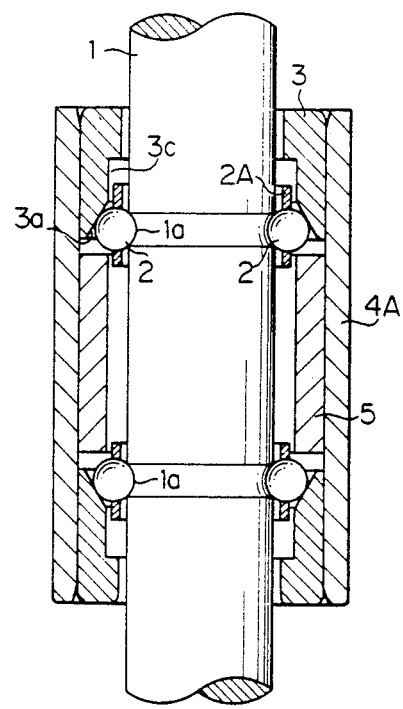
FIG. 10(a) is a schematic vertical sectional view of the tenth embodiment of the present invention.
Figure 10B:
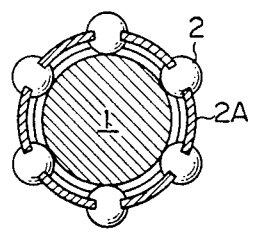
FIG. 10(b) is an explanatory plan view showing a shaft 1 with balls 2 incorporated in a retainer 2A there around.
Figure 11:
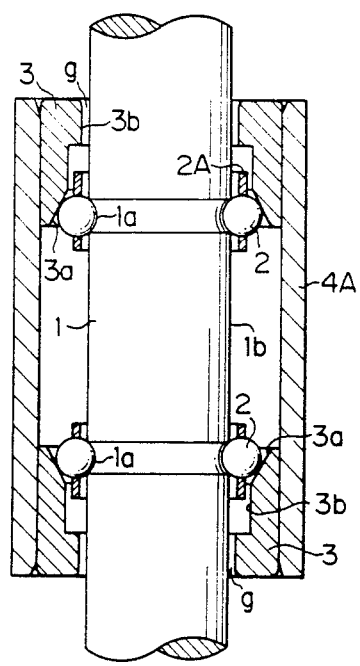
FIG. 11 is a schematic vertically sectional view of the eleventh embodiment of the present invention.

The tenth embodiment of the present invention is shown in FIG. 10. In the above described embodiments, no means of particularly holding the balls 2 arranged around the shaft 1 is provided and therefore, at a rotation above a medium speed, the balls will contact each other and be likely to generate noise and mechanical losses.

In this tenth embodiment, the balls are held at a proper spacing from each other to prevent the balls from contacting each other and to control the generation of noise and mechanical losses to a minimum.

That is to say, the balls 2 are held by a ring-shaped retainer 2A so as to be positioned between the groove 1a of the shaft 1 and the tapered surface 3A of the outer race. In such case, a retainer escaping part 3c is formed in the outer sleeve 3.

In assembling, for example, first of all, a proper number of balls are put at intervals into the retainer 2A within a jig (not illustrated). This jig is made to have a magnetic force or attracting force so that the balls may be incorporated while being prevented from dropping.

On the other hand, the sleeve 5 is fixed as by being pressed substantially in the middle within the bearing housing and the shaft 1 is inserted into the sleeve 5. Then, the balls 2 held at a spacing from each other in the upper or lower retainer 2A are put into the groove 1a and grease or oil is injected into such part. Then, the outer race 3 to be positioned on the side of the opening of the bearing housing A is put through the same opening to press the balls 2 with the tapered surface 3a and is fixed in a proper position on the inner peripheral surface of the bearing housing 4A. Then, the balls 2 and outer race 3 on the other side are put in in the same manner and the rotor 6A and pulley 7 may be fixed to the respective end parts of the shaft 1 as shown in FIG. 1.

In the eleventh embodiment of the present invention, the sleeve 5 for preventing the balls 2 from dropping in the above described tenth embodiment is not required so that the assembly may be that much simpler.

Figure 12A:
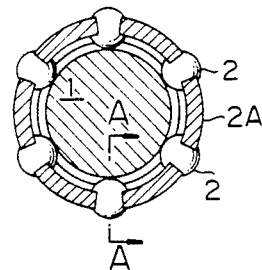
FIG. 12(a) is an explanatory plan view showing a shaft 1 provided around it with balls 2 incorporated in a retainer 2A.
Figure 12B:
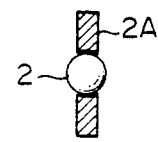
FIG. 12(b) is a sectioned view on line A—A in FIG. 12(a).

In such case, the retainer 2A is ring-shaped particularly as shown in FIGS. 12(a) and (b) and is made of a resilient member such as a synthetic resin or metal. The balls 2 are held by this retainer 2A through ball receiving parts consisting of holes arranged at proper intervals and having a diameter substantially equal to or somewhat smaller than the diameter of the ball. This retainer 2A has such clearance through which the balls 2 will not come out between it and the balls and the balls 2 are forced into the retainer.

Figure 13:
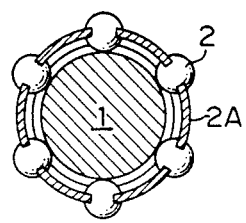
FIGS. 13 and 14 show respectively other modes of the retainer.
Figure 14:
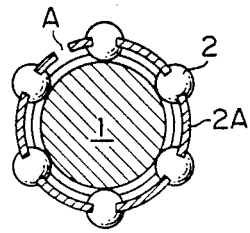

Otherwise, the retainer 2A may be an ordinary one as is shown in FIG. 13 or it may be made of a resilient material having a cut A formed in a part as shown in FIG. 14 so as to be variable in the inside diameter.

Figure 15:
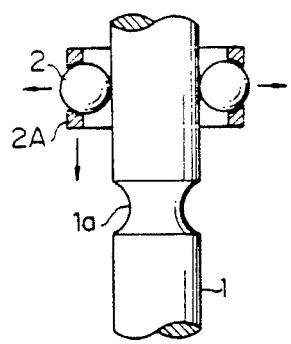
FIG. 15 is an explanatory view of the assembly.
Figure 15:
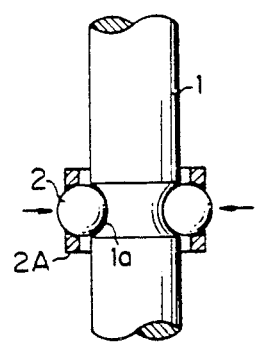

In assembling, as shown in FIG. 15(1), the retainer 2A with the balls incorporated in advance is pushed onto the outer periphery of the shaft 1. In such case, the retainer 2A will be pushed to expand somewhat outward as shown by the arrows by the shaft 1 and balls 2 in contact with the shaft. That is to say, the retainer 2A is naturally larger in diameter than the shaft 1 but, in the case of fitting the balls 2 on the outer periphery of the shaft, will be of such diameter as will be pushed to expand somewhat outward against the resilient force of the material. As shown in FIG. 15(2), when the retainer 2A is pushed in to reach the groove 1a, the retainer will contract so much that the balls will not drop but will be respectively fitted in the groove 1a. Then, when the assembly is inserted into the bearing housing 4A and the outer races 3 are respectively inserted from outside, a spindle unit will be able to be assembled without using any sleeve.

In using it, the inner peripheral surface 3b of the outer race 3 is so close to the outer peripheral surface 1b of the shaft 1 that the entry of dust or the like will be able to be prevented by the dust preventing fine gap g to be a minimum.

Figure 16:
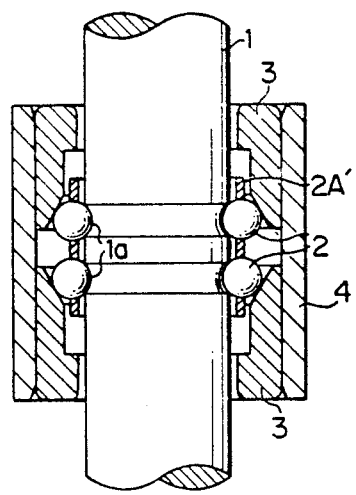
FIG. 16 is a schematic vertical sectional view of the twelfth embodiment of the present invention.

The twelfth embodiment of the present invention shown in FIG. 16 has a feature that the distance between a pair of grooves 1a formed on the outer periphery of the shaft 1 is small and the balls 2 are provided correspondingly in two steps in a retainer 2A'. The fundamental material and formation of the retainer 2A' are the same as in the above described embodiments.

In assembling, as shown in FIG. 17(1), first of all, the balls incorporated in the retainer 2A' are contacted with the outer periphery of the shaft and are pushed down toward the grooves 1a as indicated by the arrow.

Then, as shown in FIG. 17(2), when the balls 2 first positioned on the lower side in the drawing reach the upper groove 1a, the balls 2 will be fitted in the groove 1a by the resiliency of the retainer 2A'. At this time, the ball part on the upper side will remain expanded outward.

When the balls 2 in two upper and lower steps are further pushed down, as shown in FIG. 17(3), the balls 2 will be fitted in the respective grooves 1a so as to be fitted on the outer periphery of the shaft 1.

Figure 18:
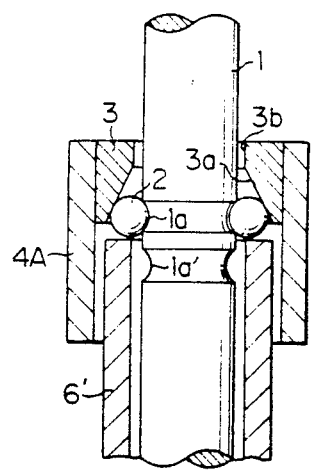
FIGS. 18(1) to (4) are explanatory views of the thirteenth embodiment and its assembly.
Figure 18:
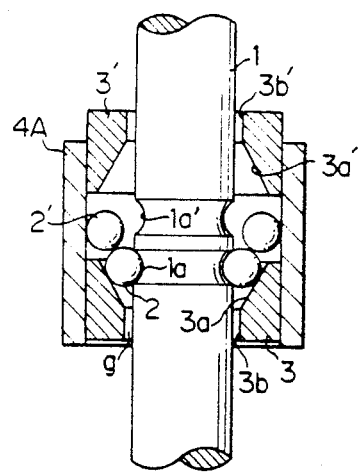
Figure 18:
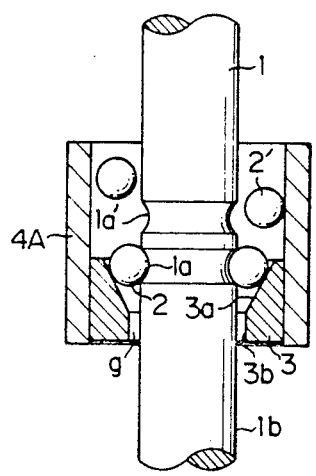
Figure 18:
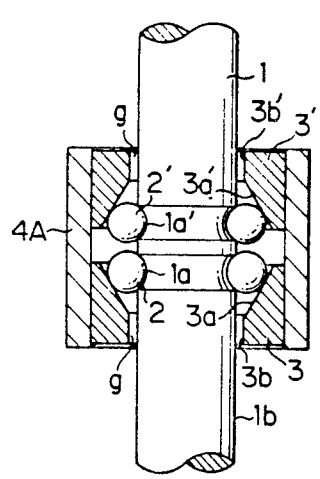

In the thirteenth embodiment of the present invention shown in FIG. 18, the distance between a pair of grooves formed on the outer periphery of the shaft 1 is so small that no sleeve for preventing the balls from dropping is required, assembled parts are decreased and assembly is improved.

That is to say, in assembling, first of all, as shown in FIG. 18(1), the shaft 1 is inserted into a hollow part provided with one outer race 3 in one end part of the bearing housing 4A and is arranged in a proper position. Then, in the illustrated state, a proper number of balls 2 are inserted from the lower side. In such case, a ball receiving jig 6' is used to prevent the balls 2 from dropping. Thus, the balls 2 will be rotatably supported by the respective ball rolling surfaces of the groove 1a and the tapered surface 3a of the outer race 3. The outer race 3 will be fixed in a position adapted to support the balls 2.

Then, as shown in FIG. 18(2), the above mentioned assembly is turned upside down and a proper number of balls 2' are inserted between the bearing housing 4A and shaft 1 from the upper side.

Then, as shown in FIG. 18(3), the other outer race 3' is inserted into the bearing housing 4A and, as shown in FIG. 18(4), the balls 2' are rotatably supported by the tapered surface 3a' of this outer race 3' and the groove 1a' and the outer race 3' is fixed in a proper position so that a light thin short spindle unit may be assembled. That is to say, in the spindle unit of the present invention, the distance between the grooves 1a and 1a' is so short that no sleeve is required, therefore the weight is light, the balls 2 and 2' are held directly by the shaft 1 and the outer races 3 and 3' provided on the outer periphery of the shaft 1 and therefore the type is thin.

By the way, in use, the inner peripheral surfaces 3b and 3b' of the respective outer races 3 and 3' are so close to the outer peripheral surface 1b of the shaft 1 that the entry of the dust or the like into the ball parts will be prevented by this dust preventing fine gap g. (See FIG. 18(4).)

Figure 19:
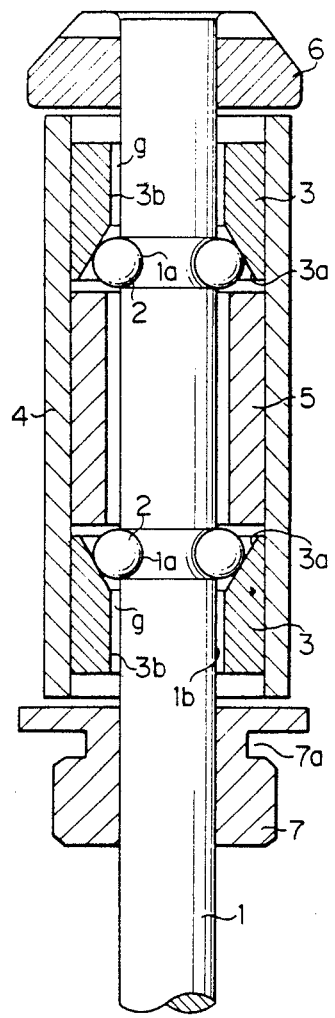
FIG. 19 shows an example of applying the present invention to a tape guiding roller.

In the fourteenth embodiment of the present invention shown in FIG. 19, the structure of the rotating part of the above mentioned spindle unit is applied to a roller such as a tape guiding roller.

That is to say, in the drawing, the reference numeral 1 represents a substantially columnar shaft, a pair of grooves 1a for receiving balls are formed as separated from each other as by cutting in the upper and lower parts of the outer periphery of this shaft 1 and a proper number of spherical balls 2 are partly and rotatably received in each of these grooves. The reference numeral 3 represents a cylindrical outer race provided above or below, tapered at the inner end and expanding in the diameter successively inward. These tapered surfaces 3a contact the balls 2 to hold the balls provided above and below. The inner peripheral surface 3b is not in contact with the outer peripheral surface 1b of the shaft 1 to form a dust preventing gap g. A cylindrical bearing housing 4 is provided on the outer periphery of the outer race 3. The outer peripheral surface of the outer race 3 is fixed to the inner peripheral surface of this bearing housing 4. A cylindrical sleeve 5 is provided between a pair of outer races 3 to prevent the balls 2 from dropping in assembling, is fixed by its outer peripheral surface to the inner peripheral surface of the bearing housing 4, is positioned at the outer ends near the balls and is not in contact with the outer races 3, balls 2 and shaft 1. Reference numeral 6 represents a pulley fixed to the upper end part of the shaft 1 and is not in contact with the bearing housing 4 and outer races 3. Reference numeral 7 represents a pulley having a fitting part 7a for fitting to a chassis (not illustrated) or the like and fixed to the lower end part of the shaft 1.

In assembling, first of all, the sleeve 5 is fixed as by being pressed substantially in the middle within the bearing housing 4 and the shaft 1 is inserted into the sleeve 5. Then, a proper number of balls 2 on the upper or lower side are put into the groove 1a and grease or oil is injected into the same part. Then, the outer race 3 positioned on the opening side of the bearing housing 4 is put in through the same opening to press the balls 3 with the tapered surface 3a and is fixed in a proper position on the inner peripheral surface of the bearing housing 4. Then, the balls 2 and outer race 3 on the other side may be put in in the same manner and the pulleys 6 and 7 may be fixed to the respective end parts of the shaft 1. In the above mentioned assembling step, before the pulleys 6 and 7 are fixed, the rotation precision of the bearing housing 4 can be confirmed and, by finely adjusting the position of the outer race 3, the clearance between the outer race 3 and balls 2 can be easily adjusted, a favorable rotation performance can be obtained and thus the bearing housing 4 can be rotatably supported with respect to the shaft 1. The inner peripheral surface 3b of the outer race 3 is so close to the outer peripheral surface of the shaft 1 that the entry of dust or the like into the ball parts can be prevented by this dust preventing fine gap g to a minimum.

Figure 20:
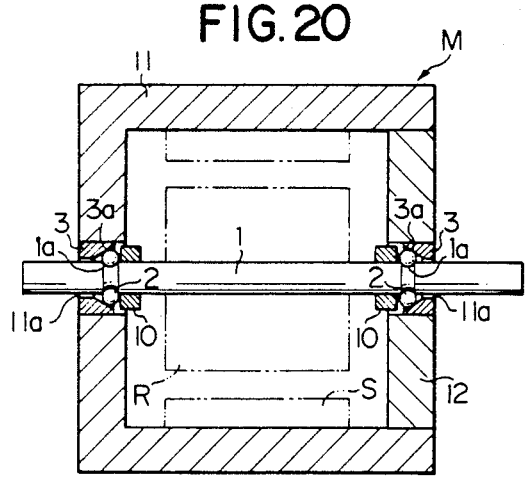
FIG. 20 shows an example of applying the present invention to a bearing for the shaft of a motor.
Figure 21:
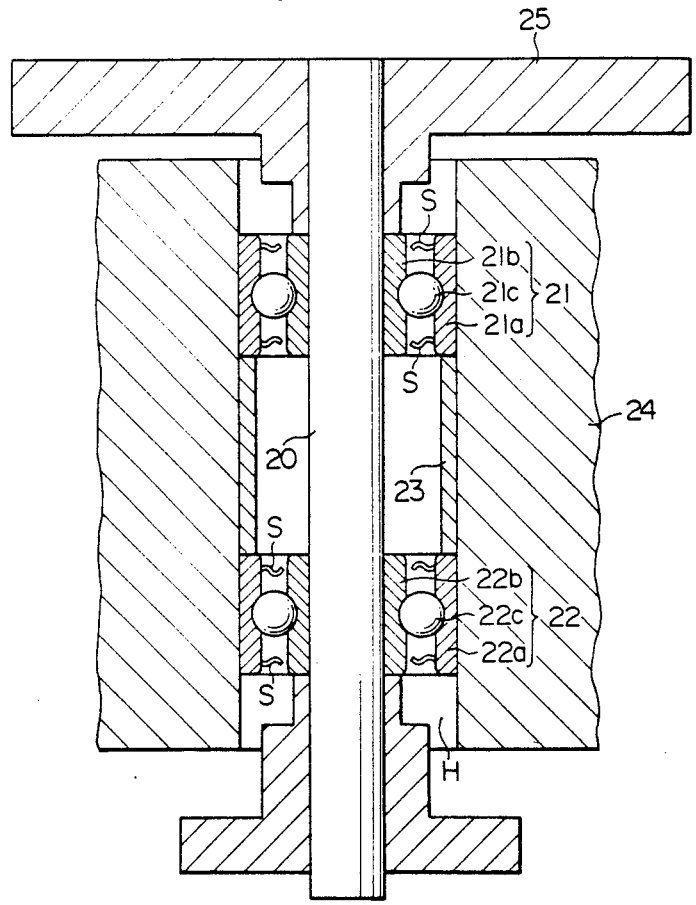
FIG. 21 shows a conventional example.

In the fifteenth embodiment of the present invention shown in FIG. 20, the formation of the rotating part of the above mentioned spindle unit is applied to the bearing of the shaft 1 of a motor M.

That is to say, grooves 1a for receiving the balls 2 are formed in predetermined positions on the outer periphery of the shaft 1. Further, substantially ring-shaped ball receiving collars 10 are provided respectively inside the grooves 1a on the outer periphery of the shaft 1. Each outer race 3 is provided in a position outside the groove 1a, is not in contact with the shaft 1 and is separated from and opposed to the ball receiving collar 10. A tapered surface 3a expanding in diameter progressively inward is formed inside each outer race 3. The balls 2 arranged on the outer periphery of the shaft 1 are received by the ball receiving collars 10, grooves 1a and tapered surfaces 3a. The bearing of the rotary shaft of the motor M, that is, the shaft 1 are also formed by these members.

In the drawing, the reference numeral 11 represents a bottomed cylindrical bearing housing in which a hole 11a is formed in the center of the bottom, the shaft 1 is inserted at one end through the hole 11a to project out and the outer race 3 is fixed at its outer peripheral surface to the peripheral surface of the hole 11a. The reference numeral 12 represents a disk-shaped bracket provided in the opening part of the bearing housing 11 and having the same hole 11a formed in the center and the shaft 1 supported on the other end side through a bearing. In such case, it is preferable to make a fine gap between the inner peripheral surface of each outer race 3 and the opposed outer peripheral surface of the shaft 1 to have a dust preventing function.

By the way, as well known, a commutator and rotor R are provided on the outer periphery of the shaft 1 within the bearing housing 11, a stator S or the like is provided on the inner peripheral surface side of the bearing housing 11 and a motor M having the same bearing structure as of the rotating part of the spindle unit is formed.

According to the present invention formed as in the above, no radial ball bearing of a costly double sealing structure is required, the number of parts reduces to be fewer than in the spindle unit using the above mentioned conventional radial ball bearings and the cost can be that much reduced.

The inner race and shaft can be made integral and the bearing housing can be worked after the assembling to improve the precision.

Further, the number of balls can be increased as required in the assembling step and the required rigidity can be easily obtained.

There is required no such complicacy that, in the conventional radial ball bearing, in order to make the clearance between the inner race and outer race proper for the diameter of the balls, the dimensions of the outside diameter of the inner race and the inside diameter of the outer race must be measured so as to obtain a combination keeping a proper clearance. The diameter of the balls can be made somewhat larger as required and the rigidity can be increased.

What is claimed is:

1. A spindle unit comprising a cylindrical shaft having an outer peripheral surface with an annular groove provided therein, said groove having a part circular cross section, a plurality of spherical balls partly received in said groove and partly projecting therefrom, said balls being rotatable in said groove, an annular race adjacent to said groove and having a tapered surface bearing against the balls partly projecting from the adjacent groove to hold the balls within the groove, means by which said race applies the tapered surface thereof against said balls with pressure to retain the balls in said groove, a bearing housing in which said race is supported, said bearing housing having a cylindrical outer surface, said shaft having opposite ends projecting from said housing, and rotor means fixed on each of the ends of the shaft projecting from the housing for rotation with said shaft, the rotor means on one of said ends comprising a pulley.

2. A spindle unit as claimed in claim 1 wherein said means by which said race applies the tapered surface against said balls applies resilient pressure to said balls at said tapered surface.

3. A spindle unit as claimed in claim 2 wherein said means which applies resilient pressure comprises a spring bearing axially against said race.

4. A spindle unit as claimed in claim 1 wherein said means which applies resilient pressure comprises a threaded ring in said housing bearing against said race.

5. A spindle unit as claimed in claim 1 comprising a sleeve fixed to said bearing housing and having an end facing said groove and said balls therein in spaced relation to serve as a retainer for said balls during assembly of said spindle unit.

6. A spindle unit as claimed in claim 5 comprising a retainer means holding said balls in spaced relation from one another in said groove.

7. A spindle unit as claimed in claim 5 wherein said end of said sleeve is spaced from said race and positioned in proximity to said groove.

8. A spindle unit as claimed in claim 1 wherein one of said rotor means includes means for attachment to a chassis; said bearing housing being rotatable on said shaft.

9. A spindle unit as claimed in claim 1 wherein said race forms a clearance gap with said shaft to oppose entry of dust therebetween, the only contact between the housing and the shaft being obtained through the balls seated in the port-circular groove in the shaft and the tangential contact of the tapered surface of the race with each of the balls.

10. A spindle unit comprising a cylindrical shaft having an outer peripheral surface with a pair of axially spaced annular grooves provided therein, said grooves each having a part-circular cross section,
- a plurality of spherical balls partly received in said grooves and partly projecting therefrom, said balls being rotatable in said grooves,
- a pair of axially spaced annular races each adjacent to a respective one of said grooves and each having a tapered conical surface, the tapered surfaces of the two races wideneing in diameter towards one another, each of said tapered surfaces bearing against the balls partly projecting from the respective adjacent groove to hold the balls within the groove such that the balls in each groove are retained by contact with the single tapered surface of the respective race,
- means applying pressure to said races for urging the tapered surfaces of said races against said balls to apply pressure thereto to retain the balls in said grooves,
- said bearing housing having a cylindrical outer surface, said shaft having opposite ends projecting from said housing, and
- a rotor means fixed on each of the ends of the shaft projecting from the housing for rotation with said shaft, the rotor means on one of said ends comprising a pulley.

11. A spindle unit as claimed in claim 10 wherein said means applies by which applies the tapered surface against said balls resilient pressure to said balls at each said tapered surface.

12. A spindle unit as claimed in claim 11 wherein said means which applies resilient pressure comprises a spring bearing axially against each said race.

13. A spindle unit as claimed in claim 10 wherein said means which applies resilient pressure comprises a threaded ring in said housing bearing against each said race.

14. A spindle unit as claimed in claim 10 comprising a sleeve secured to said housing between said races and forming a clearance with said shaft.

15. A spindle unit as claimed in claim 14 wherein said sleeve has opposite ends respectively facing said grooves and said balls therein in spaced relation to serve as a retainer for said balls during assembly of said spindle unit.

16. A spindle unit as claimed in claim 15 comprising retainer means for holding said balls in spaced relation from one another in each said groove.

17. A spindle unit as claimed in claim 16 wherein said ends of said sleeve are spaced from said race and positioned in proximity to said grooves.

18. A spindle unit as claimed in claim 10 comprising a retainer holding said balls in spaced relation from one another in each said groove.

19. A spindle unit as claimed in claim 10 wherein one of said rotor means includes means for attachment to a chassis, said bearing housing being rotatable on said shaft.

* * * * *